United States Patent
Rodriguez et al.

(10) Patent No.: US 6,288,298 B1
(45) Date of Patent: *Sep. 11, 2001

(54) NAPHTHA CRACKING UTILIZING NEW CATALYTIC SILICOALUMINOPHOSPHATES HAVING AN AEL STRUCTURE

(75) Inventors: Javier Agundez Rodriguez; Joaquin Perez Pariente, both of Madrid; Antonio Chica Lara, Jaen; Avelino Corma Canos, Valencia, all of (ES); Tan Jen Chen; Philip A. Ruziska, both of Kingwood, TX (US); Brian Erik Henry, Baton Rouge, LA (US); Gordon F. Stuntz, Baton Rouge, LA (US); Stephen M. Davis, Baton Rouge, LA (US)

(73) Assignee: ExxonMobil Chemical Patents Inc., Houston, TX (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/315,417

(22) Filed: May 20, 1999

Related U.S. Application Data

(60) Provisional application No. 60/086,681, filed on May 26, 1998.

(51) Int. Cl.$^7$ .................................................. C07C 4/02
(52) U.S. Cl. .................... 585/648; 585/654; 585/653; 585/650; 208/134; 208/135; 208/113; 208/114; 208/118
(58) Field of Search .......................... 585/648, 654, 585/653, 650; 208/134, 135, 113, 114, 118

(56) References Cited

U.S. PATENT DOCUMENTS

| | | | |
|---|---|---|---|
| 4,440,871 | 4/1984 | Lok | 502/214 |
| 4,499,315 | 2/1985 | Garska et al. | 585/415 |
| 4,512,875 | 4/1985 | Long et al. | 208/114 |
| 4,683,050 | 7/1987 | Ward | 208/110 |
| 4,724,066 | 2/1988 | Kirker | 208/114 |
| 4,734,185 | 3/1988 | Pellet et al. | 208/114 |
| 4,791,083 | 12/1988 | Pellet | 502/64 |
| 4,803,184 | 2/1989 | Long et al. | 502/63 |
| 4,818,739 | 4/1989 | Gortsema et al. | 502/67 |
| 4,826,804 | 5/1989 | Shamshoum | 502/214 |
| 4,857,495 | 8/1989 | Gortsema et al. | 502/214 |
| 4,859,311 | 8/1989 | Miller | 208/89 |
| 4,859,312 | 8/1989 | Miller | 208/111 |
| 4,859,314 | 8/1989 | Pellet et al. | 208/114 |
| 4,880,760 | 11/1989 | Pellet et al. | 502/67 |
| 4,906,351 | 3/1990 | Pellet et al. | 208/111 |
| 4,913,798 | 4/1990 | Gortsema et al. | 208/111 |
| 4,914,067 | 4/1990 | Pellet et al. | 502/63 |
| 4,921,594 | 5/1990 | Miller | 208/58 |
| 4,943,424 | 7/1990 | Miller | 423/328 |
| 4,960,504 | 10/1990 | Pellet et al. | 208/411 |
| 4,976,846 | 12/1990 | Long et al. | 208/114 |
| 4,992,160 | 2/1991 | Long et al. | 208/111 |
| 5,087,347 | 2/1992 | Miller | 208/46 |
| 5,096,684 | 3/1992 | Guth et al. | 423/306 |
| 5,139,684 | 8/1992 | Miller | 208/100 |
| 5,149,421 | 9/1992 | Miller | 208/114 |
| 5,185,310 | 2/1993 | Degnan et al. | 502/214 |
| 5,208,005 | 5/1993 | Miller | 423/792 |
| 5,300,277 | 4/1994 | Kresge et al. | 423/703 |
| 5,360,474 | 11/1994 | Lauth et al. | 106/402 |
| 5,413,695 | 5/1995 | Miller | 208/28 |
| 5,472,594 | 12/1995 | Tsang et al. | 208/114 |
| 5,486,284 | 1/1996 | Degnan et al. | 208/120 |
| 5,723,716 | 3/1998 | Brandes et al. | 585/734 |
| 5,730,858 | 3/1998 | Olivier et al. | 208/28 |
| 5,770,042 | 6/1998 | Galperin et al. | 208/65 |
| 5,804,058 | 9/1998 | Grandvallet et al. | 208/171 |
| 5,831,139 | 11/1998 | Schmidt et al. | 585/315 |
| 5,833,837 | 11/1998 | Miller | 208/80 |
| 5,879,655 | 3/1999 | Miller et al. | 423/702 |
| 5,888,378 | 3/1999 | Kowalski | 208/114 |
| 5,989,518 | 11/1999 | Tannous et al. | 423/717 |

FOREIGN PATENT DOCUMENTS 146384  6/1990  (EP).

OTHER PUBLICATIONS

K.J. Chao, et al., Silicon species in a SAPO–5 molelcular sieve, Applied Catalysis, 72, (1991) 34–39, No Month.

M.J. Franco, et al., Study of SAPO–5 obtained from surfactant–containing gels: Part 1. Crystallization parameters and mechanism of Si substitution, Zeolites 15:117–123 (1995), No Month.

J. Agundez, et al., Synthesis of SAPOs from Microemulsions: A General Method to Obtain Materials with Enhanced Catalytic Activity (Abstract), 11th International Zeolite Conference, RP25, 1996, No Month.

J. Agundez, et al., Synthesis of SAPOs from Microemulsions: A General Method to Obtain Materials with Enhanced Catalytic Activity, Discussions on Zeolite and Microporous Materials, 1997, Hanrimwon Publishing Co., Seoul, Korea, No Month.

P. Meriaudeau, et al., Isomorphous substitution of silicon in the AlPO4 framework with AEL structure: n–octane hydroconversion, Microporous and Mesoporous Materials 22 (1998) 435–449, No Month.

*Primary Examiner*—Benjamin L. Utech
*Assistant Examiner*—Nadine Preisch

(57) ABSTRACT

Disclosed are silicoaluminophosphates (SAPOs) having unique silicon distributions, a method for their preparation and their use as catalysts for the catalytic cracking of hydrocarbon feedstocks. More particularly, the new SAPOs have a high silica:alumina ratio, and are prepared from microemulsions containing surfactants.

21 Claims, 10 Drawing Sheets

Figure 1

| P | Al | P | Al | P | Al | P | Al | P | Al |
|---|---|---|---|---|---|---|---|---|---|
| Al | P | Al | Si | Al | P | Al | P | Al | P |
| P | Al | P | Al | P | Al | Si | Al | P | Al |
| Al | P | Al | P | Al | Si | Si | Si | Al | P |
| P | Al | P | Al | P | Al | Si | Al | P | Al |
| Al | P | Al | Si | Al | P | Al | P | Al | P |
| P | Al | Si | Si | Si | Al | P | Al | P | Al |
| Al | P | Al | Si | Si | Si | Al | P | Al | P |
| P | Al | Si | Si | Si | Al | P | Al | P | Al |
| Al | P | Al | Si | Si | Si | Al | P | Al | P |
| P | Al | Si | Si | Si | Al | P | Al | P | Al |
| Al | P | Al | Si | Al | P | Al | P | Al | P |
| P | Al | P | Al | P | Al | P | Al | P | Al |
| Al | P | Al | P | Al | P | Al | P | Al | P |

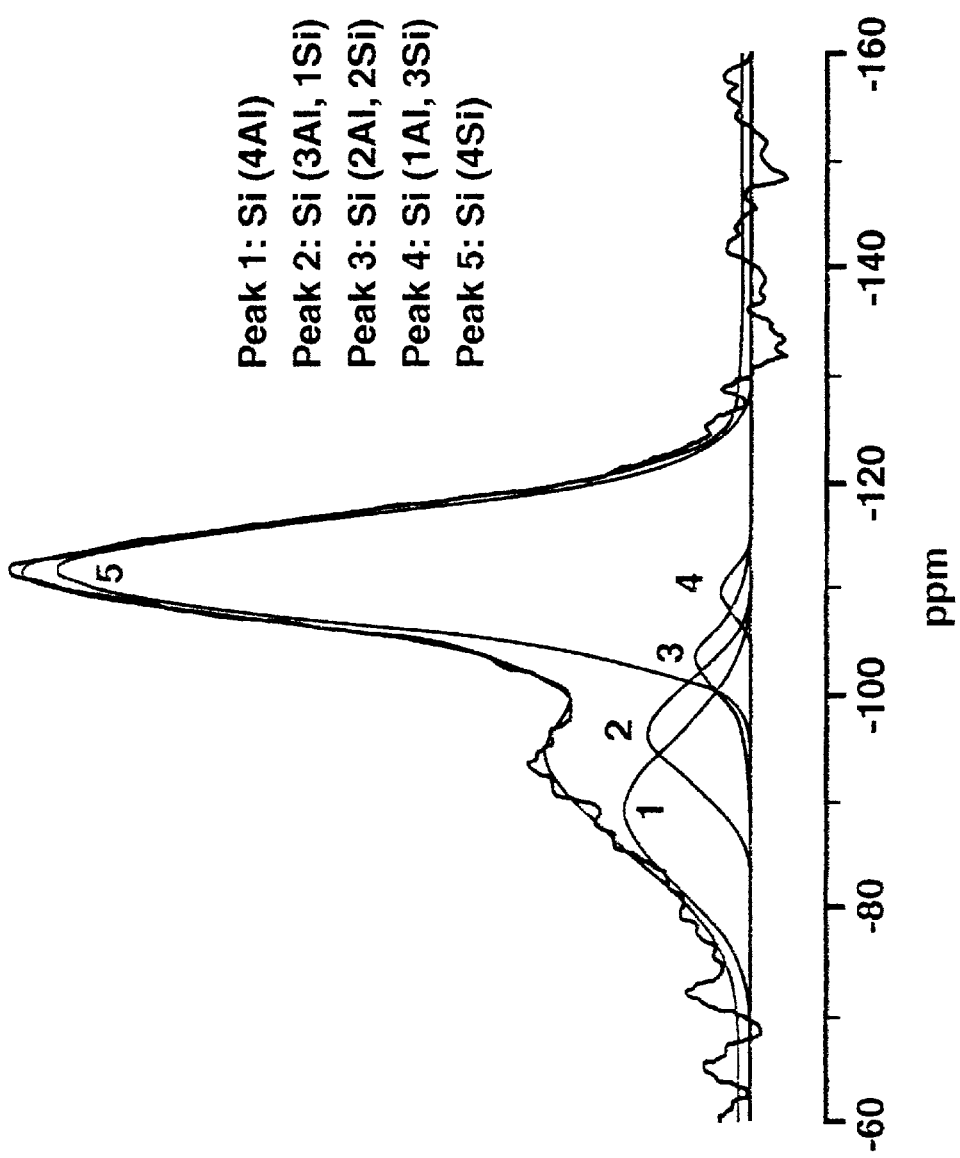
FIGURE 5-A
Simulation of $^{29}$Si MAS NMR spectrum of sample 1-a
Peak 1: Si (4Al)
Peak 2: Si (3Al, 1Si)
Peak 3: Si (2Al, 2Si)
Peak 4: Si (1Al, 3Si)
Peak 5: Si (4Si)

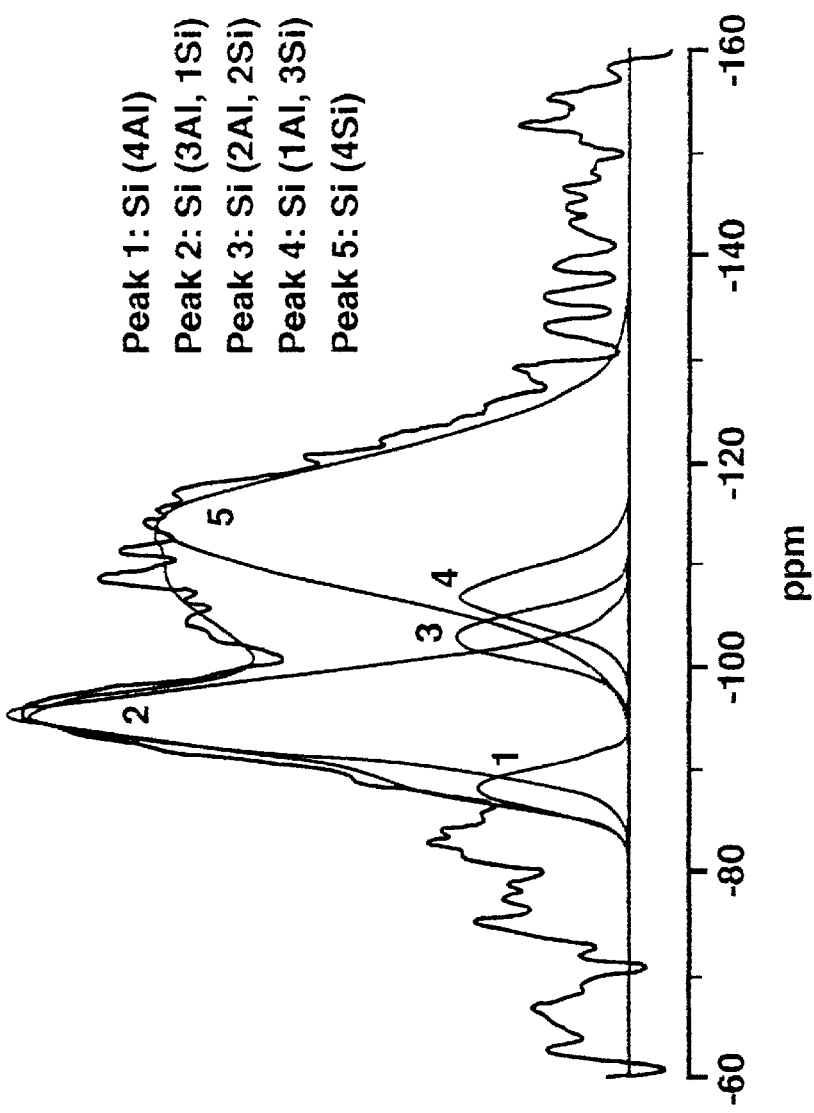
FIGURE 5-B

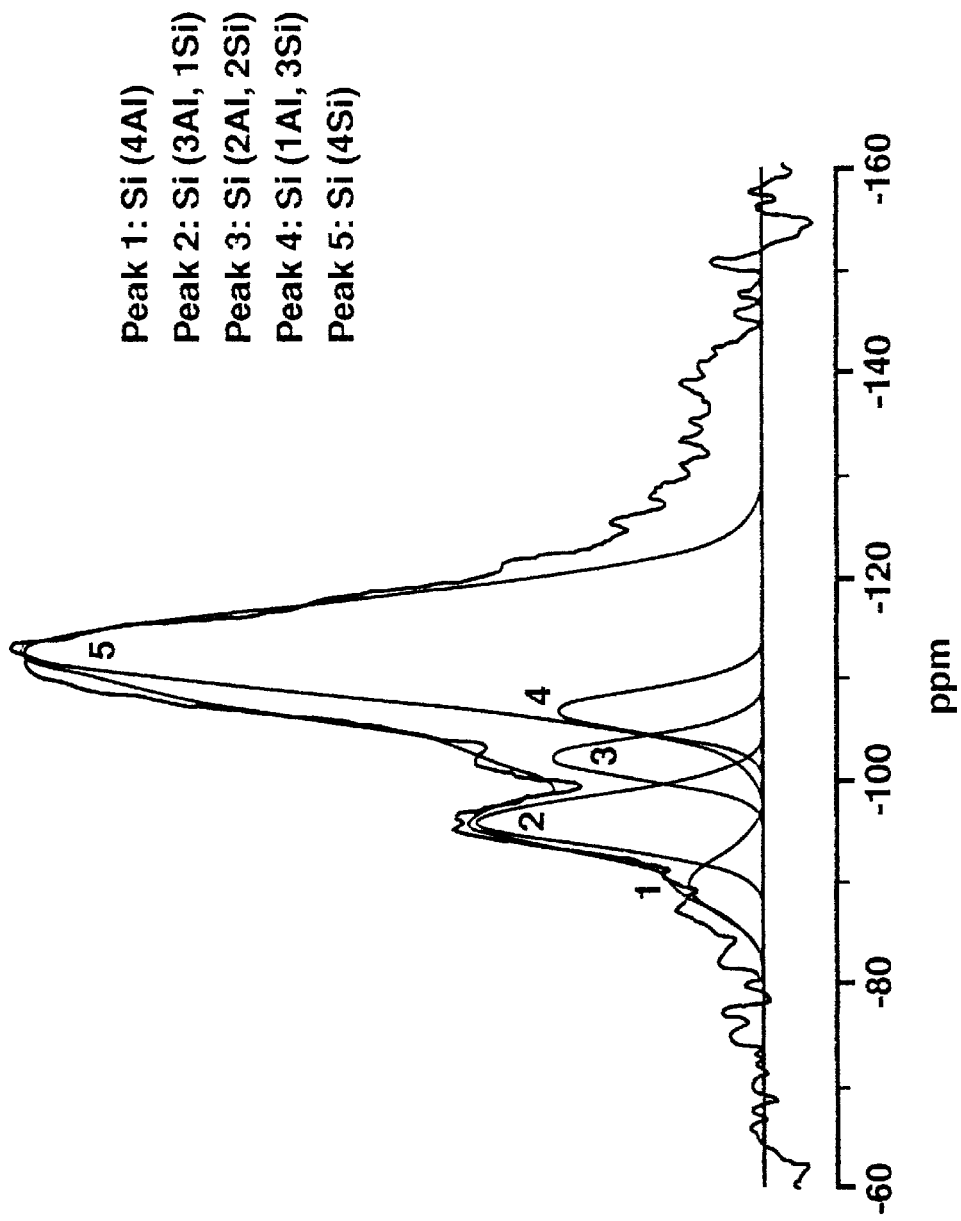
FIGURE 5-C
Simulation $^{29}$Si MAS NMR spectrum of sample 1-c
Peak 1: Si (4Al)
Peak 2: Si (3Al, 1Si)
Peak 3: Si (2Al, 2Si)
Peak 4: Si (1Al, 3Si)
Peak 5: Si (4Si)

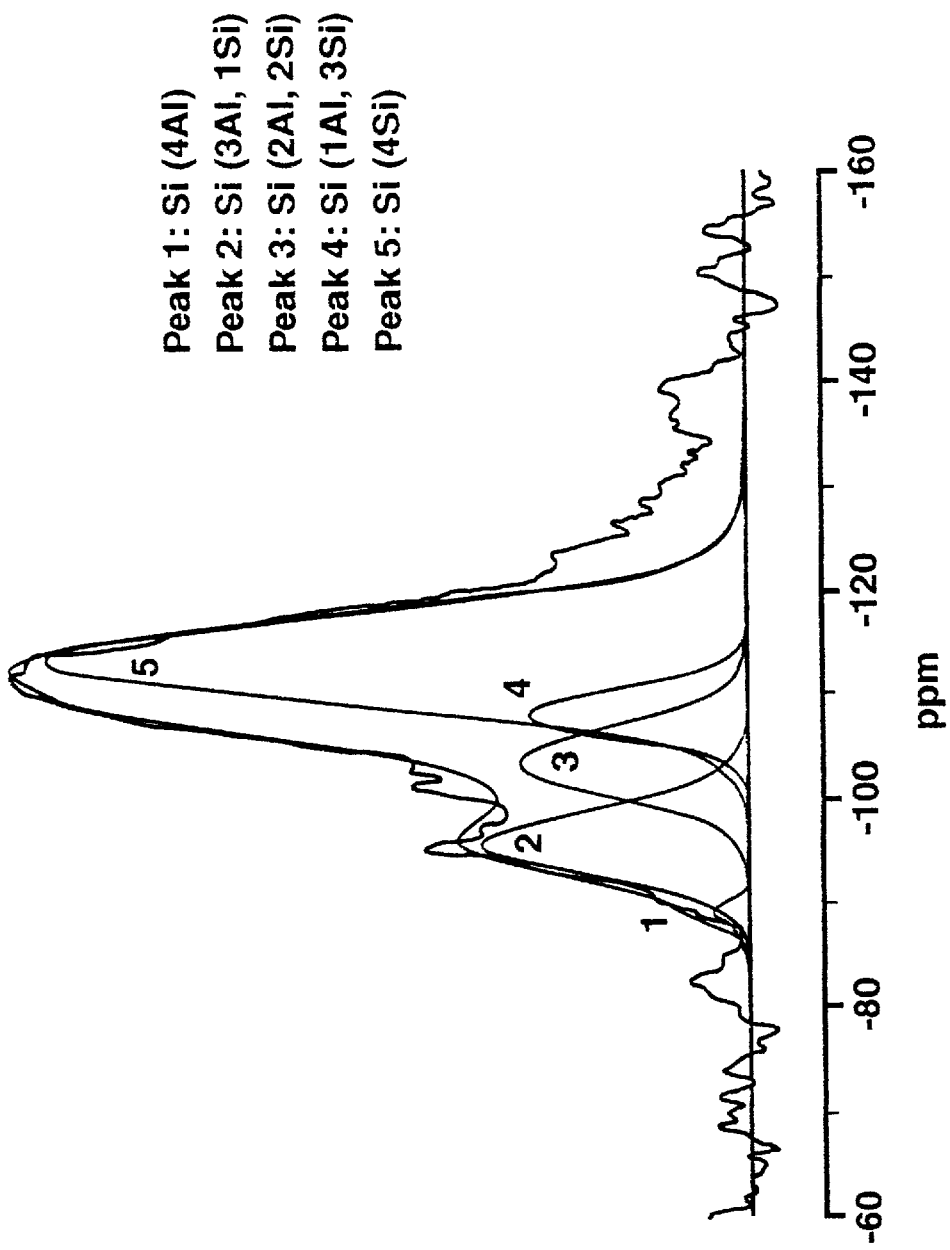
FIGURE 5-D
Simulation $^{29}$Si MAS NMR spectrum of sample 1-d
Peak 1: Si (4Al)
Peak 2: Si (3Al, 1Si)
Peak 3: Si (2Al, 2Si)
Peak 4: Si (1Al, 3Si)
Peak 5: Si (4Si)

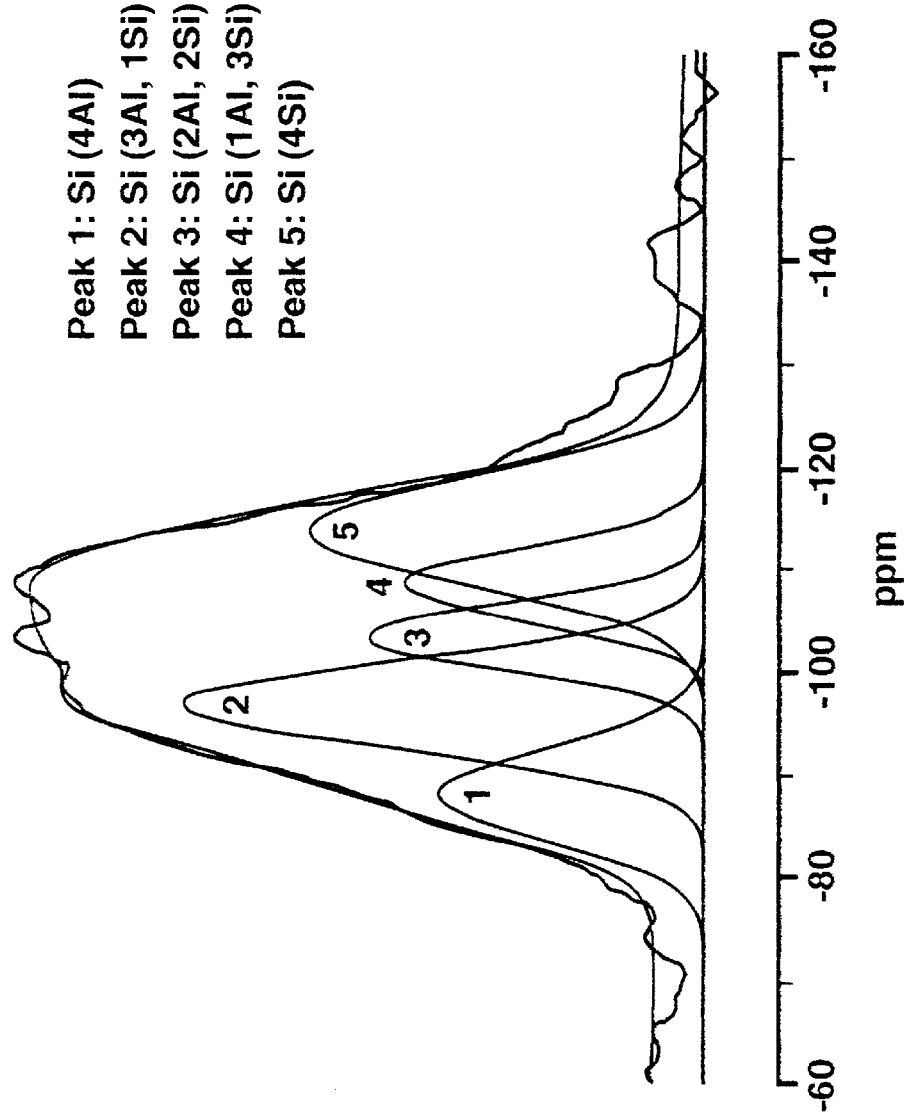
FIGURE 5-E
Simulation $^{29}$Si MAS NMR spectrum of sample 2-a
Peak 1: Si (4Al)
Peak 2: Si (3Al, 1Si)
Peak 3: Si (2Al, 2Si)
Peak 4: Si (1Al, 3Si)
Peak 5: Si (4Si)

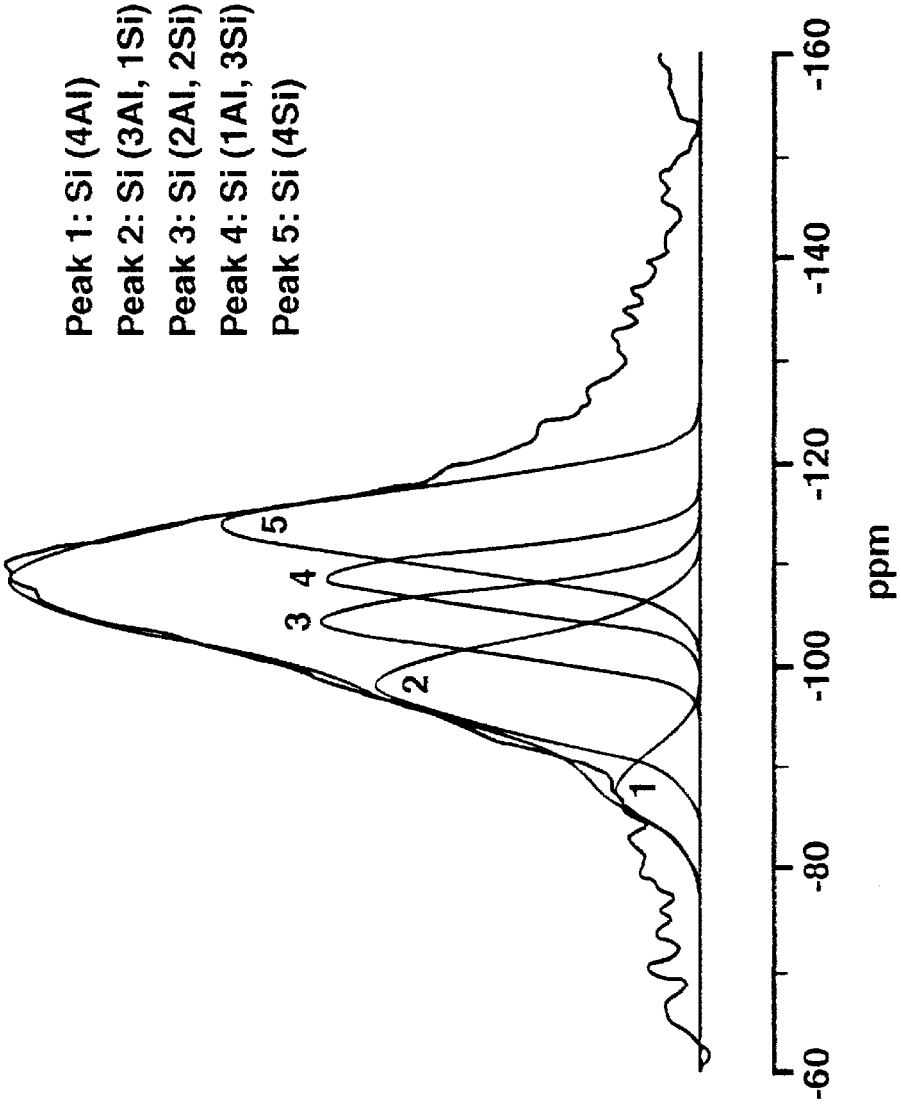

NAPHTHA CRACKING UTILIZING NEW CATALYTIC SILICOALUMINOPHOSPHATES HAVING AN AEL STRUCTURE

This application claims the benefit of U.S. Provisional Application No.: 60/086,681 May 26, 1998.

FIELD OF THE INVENTION

This invention relates to using silicoaluminophosphates ("SAPO"s) having unique silicon distributions and their use as naphtha cracking catalysts for cracking hydrocarbon feedstocks. More particularly, the SAPOs have a high silica:alumina ratio, and are prepared from microemulsions containing surfactants.

BACKGROUND OF THE INVENTION

Conventional microporous crystalline silicoaluminophosphates such as SAPO-11 may be prepared by hydrothermal crystallization of silicoaluminophosphate gels containing a molecular structure forming template. SAPOs are members of a class known as non-zeolitic molecular sieves. SAPO molecular sieves have a framework of $AlO_4$, $SiO_4$ and $PO_4$ tetrahedra linked by oxygen atoms. The negative charge in the network is balanced by the inclusion of exchangeable protons or cations such as protonated amines or alkylammonium. The interstitial spaces of channels formed by the crystalline network enables SAPOs to be used as molecular sieves in a manner similar to zeolites, which are crystalline aluminosilicates.

More recently a new silicoaluminophosphates have been prepared that are isostructural with conventional SAPO-11, but having a dramatically higher silicon:aluminum ratio and appropriate silicon distribution. Such materials are prepared from microemulsions.

Conventional SAPOs may be used as catalysts in petroleum processing. For example, SAPO catalysts may be used in lubricating oil hydroconversion procedures, hydrocracking, dewaxing, and combinations thereof. Conventional SAPO catalysts may also be used in naphtha cracking processes for forming light olefins such as propylene.

There remains a need, though, for improved silicoaluminophosphates for use in hydrocarbon processing.

SUMMARY OF THE INVENTION

In one embodiment, the invention is a process for selectively producing $C_2$ to $C_4$ olefins, the process comprising contacting, under catalytic conversion conditions, a catalytically or thermally cracked naphtha containing paraffins and olefins with a catalytically effective amount of a catalyst composition containing a SAPO catalyst, the SAPO catalyst having a total silicon amount ranging from about 0.2 molar % to about 40 molar %, a total aluminum amount ranging from about 30 molar % to about 49.9 molar %, and a total phosphorus amount ranging from about 10 molar % to about 49.9 molar %, the molar percents being based on the total amount of aluminum, phosphorus, and silicon present in the composition, and the SAPO catalyst being isostructural with a SAPO-11 having the AEL structure and containing silicon, aluminum, and phosphorus, wherein (a) the silicon present in the SAPO catalyst is distributed among silicon sites, each site having a first, a second, a third, and a fourth nearest neighbor position, and each position being independently occupied by one atom selected from silicon and aluminum, and (b) the composition has a first number of silicon sites having silicon atoms in the four nearest neighbor positions (Si4Si), a second number of silicon sites having silicon atoms in three of the four nearest neighbor positions (Si3Si), and a third number of silicon sites having silicon atoms in two of the four nearest neighbor positions (Si2Si), wherein
  (i) the sum of the first, second, and third number of silicon sites ranges from about 10 to about 80 molar %, and
  (ii) the molar ratio of the sum of the third and second number of silicon sites to the first number of silicon sites ranges from about 0.7 to about 1.4, the molar % being based on the total number of silicon sites.

BRIEF DESCRIPTION OF THE DRAWINGS

FIG. 1 schematically illustrates the local arrangement of Si atoms in a SAPO framework.

FIG. 5 shows $^{29}Si$ MAS NMR result for the samples described herein. FIG. 5-a corresponds with sample 1-a, 5-b with sample 1-b, 5-c with sample 1-c, 5-d with sample 1-d, 5-e with sample 2-a, and 5-f with sample 2-b.

DETAILED DESCRIPTION OF THE INVENTION

Figure 2:
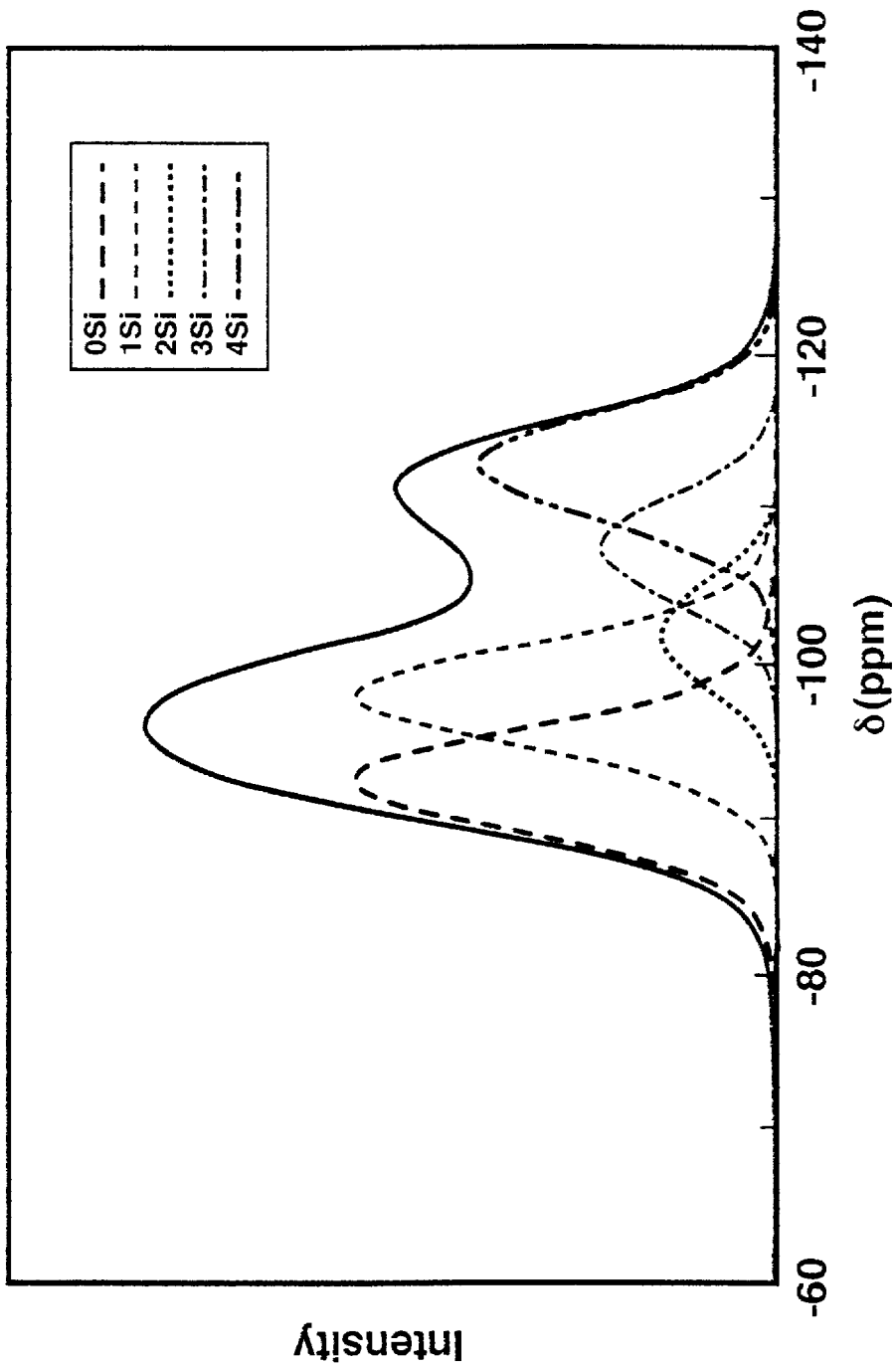
FIG. 2 is a simulated deconvolution of a $^{29}Si$ MAS NMR spectrum.

This invention relates to a new SAPO having an AEL structure as defined in the "Atlas of Zeolite Structure Types," 4th Ed, by W. M. Meier, D. H. Olson and Ch. Baerlocher, Elsevier, 1996. The new SAPO is prepared by adding an aqueous solution of phosphoric acid to alumina. The mixture is stirred and an aqueous mixture of alcohol with a low solubility in water, such as n-hexanol, pentanol, butanol, and mixtures thereof, and a neutral or cationic surfactant, such as hexadecylamine, decylamine, hexadecyltrimethylammonium salt, and mixtures thereof is added to the mixture of phosphoric acid and alumina. To this mixture is added a silicon source material such as silicon alkoxide, and preferably tetraethylorthosilicate, and the resultant mixture stirred. The result gel may be calcined in order to form the SAPO materials of this invention. It has been discovered that such materials are effective catalysts for reaction such as lubricating oil hydroprocessing and catalytic cracking, including naphtha cracking. The new SAPO materials have much improved activity and selectivity over SAPOs having an AEL structure and prepared by methods not described in the current invention.

While not wishing to be bound, it is believed that the enhanced catalytic activity in these new SAPO materials results from modifying the synthesis of a silicon-substituted aluminophosphate by changing the composition of the synthesis mixture and the length of time taken to crystallize the product in order to modify the silicon distribution in the silicoaluminophosphate thus formed. The changed distribution of silicon is believed to have a major beneficial influence on the catalytic activity of the silicoaluminophosphate.

The following sections set forth the synthesis and use of the preferred AEL-type SAPOs. Section A describes the molecular sieve synthesis processes, Section B describes preferred SAPO molecular sieve catalysts, Section C describes the physical differences between the preferred SAPO materials and conventional SAPO11, and Section D describes the use of the molecular sieve catalysts for hydrocarbon processing.

A. Synthesis of the Preferred AEL-Type SAPO Molecular Sieves

When AEL-type molecular sieve materials are synthesized following the procedure described herein, the distribution of Si and therefore the total number and strength of acid sites is quite different, and much higher than those of previously reported forms of SAPO-11.

The preferred silicoaluminophosphate composition has the structure of AEL which corresponds to SAPO-11. The AEL structure is defined in the "Atlas of Zeolite Structure Types," 4th Ed, by W. M. Meier, D. H. Olson and Ch. Baerlocher, Elsevier, 1996. Although the preferred composition is isostructural with other AEL molecular sieve materials, it is a distinct molecular sieve composition because the silicon, aluminum, and phosphorus atoms present in the composition of this invention are not arranged the same way as in AEL-type SAPO molecular sieve. Those skilled in the art will recognize that two isostructural molecular sieves may be entirely different compositions having entirely different properties, depending on, for example, the nature and distribution of the constituent atoms. One such example involves isostructural synthetic ferrierites disclosed in U.S. Pat. Nos. 3,033,974, 3,966,883, 4,000,348, 4,017,590, and ZSM-35 U.S. Pat. No. 4,016,245.

The preferred molecular sieve compositions are physically different from other SAPOs having the AEL structure because the silicon atoms are distributed differently in the molecular sieve framework. The physical structure of the preferred composition (and its silicon distribution) is illustrated schematically in FIG. 1. While the actual structure is three dimensional and contains oxygen in addition to silicon, aluminum and phosphorus, the figure's atomic positions are represented on a two-dimensional array and oxygen atoms are omitted for clarity. As is shown in the figure, each lattice site in the framework has four nearest neighbor lattice sites. In the compositions of this invention, as with all AEL-type SAPOs, a lattice site occupied by a silicon atoms, i.e., a "silicon site," ordinarily may not have a phosphorus atom as a nearest neighbor. The four next nearest neighbor lattice sites may therefore be occupied by one silicon and three aluminum atoms, two silicon and two aluminum atoms, three silicon and one aluminum atom, four silicon atoms, or four aluminum atoms, as shown in FIG. 1. As discussed, conventional AEL-type SAPOs with increased silicon concentration contain an undesirable high proportion of silicon atoms forming part of the interior of the silicon islands, i.e., silicon atoms having four silicon atoms nearest neighbors. Nevertheless, and while not wishing to be bound by any theory or model, the formation of silicon island is believed to be desirable for the silicon atoms in the border of the island are believed to lead to a negative charge that, if balanced by protons, would produce materials with acid centers whose acid strength is higher than that of isolate Si sites with the four nearest neighbor lattice sites occupied by aluminum atoms.

The silicon atoms in the preferred composition are physically distributed so that the size of the silicon island, and therefore the concentration of Si atoms having four silicon as neighbors is greatly reduced compared with other AEL-type SAPOs having the same total silicon concentration.

The molecular sieve compositions useful in this invention may be formed in accordance with conventional molecular sieve synthesis techniques from a silicoaluminophosphate gel having the formula

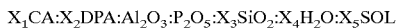

$$X_1CA:X_2DPA:Al_2O_3:P_2O_5:X_3SiO_2:X_4H_2O:X_5SOL$$

wherein CA is a surfactant such as hexadecylamine, dodecylamine or decylamine or mixtures of two or more surfactants; DPA is a template such as di-n-propylamine, diisopropylamine or tetrabutylammonium hydroxyde or mixtures of two or more templates; SOL is a solvent of low solubility in water nonlimiting examples of which are $C_4$–$C_{10}$ alcohols, such as heptanol, pentanol or butanol, polyalcohols, phenols, ketones, polyethers or mixtures of two or more solvents. Additionally, other solvents of high solubility in water could also be present, as ethanol or methanol.

$X_1$ ranges from about 0.001 to about 0.5, $X_2$ ranges from about 0.5 to 2, $X_3$ ranges from about 0.01 to about 3, $X_4$ ranges from about 4 to about 300, and $X_5$ ranges from about 0.1 to about 50.

Alumina, phosphoric acid, and water may be combined, and preferably agitated, for a time sufficient to form a uniform solution. The molar ratio of phosphoric acid to alumina is in the range specified in the previous paragraph. All the water or only a portion of the water required is combined with the alumina and the phosphoric acid. This portion is in the range 5–99% of total water, preferably in the range 10–50%. A preferred temperature for the combination is 20° C., but temperatures in the range of about 4–70° C. are suitable as well. A template such as di-n-propylamine, diisopropylamine, dodecylamine or tetrabutylammonium hydroxide may then be added, followed by surfactant such as hexadecylamaine or decylamine, an alcohol such as hexanol, pentanol or butanol, and a silica source such as tetraethyl orthosilicate, tetramethyl orthosilicate or tetrabuthyl orthosilicate in order to complete the synthesis mixture.

Stirring the synthesis mixture for about 15 minutes to about 24 hours, preferably 2 hours at room temperature, results in the formation of the synthesis gel.

The preferred molecular sieve composition may be formed by heating the gel in a microwave autoclave for a time ranging from about 6 hours to about 1 week, at a temperature ranging from about 150° C. to about 210° C., and at a pressure ranging from about 0 to about 40 bar in order to form the molecular sieve. In cases where other products, unreacted gel, or a mixture thereof is present at the conclusion of the reaction, the molecular sieve may be recovered by a separation process such as centrifugation. The process may also include conventional product washing and drying such as an ethanol rinse, followed by a de-ionized water rinse, followed by air oven drying at a temperature ranging from about 40° C. to about 110° C. It should be noted that conventional heating may be substituted for microwave heating in this process, and that a substantially pure molecular sieve composition having the AEL-structure will result with either heating method. Stoichiometries for some of the gels exemplified herein are set forth in Table 2.

B. AEL-Type Molecular Sieve Catalysts

Preferred molecular sieve materials prepared in accordance with these methods are useful as catalytic materials. While not wishing to be bound, it is believed that the silicon distribution within the molecular sieve crystal, as measured for example by $^{29}Si$ NMR, is one important characteristic influencing catalytic activity in SAPO materials. Since silicon is responsible for the acidity in SAPO materials, it is desirable that silicon be well dispersed in the aluminophosphate framework for high catalytic activity. It is known that silicon can form large silicon islands in SAPO materials. Although large silicon islands are undesirable because those silicon atoms at the interior of the islands are catalytically inactive, the small silicon-rich regions present in the preferred molecular sieve material are desirable because the strongest acid sites are believed to form at the borders of the Si-rich regions and the aluminophosphate domains. This is because those silicons at the borders have fewer aluminum atoms as nearest neighbors, which leads to decreasing acidity resulting from aluminum's lower electronegativity. The preferred AEL-type SAPO materials are believed to possess their desirable catalytic activity and selectivity because the Si atoms are well dispersed within the molecular sieve framework.

As is known to those skilled in the art, molecular sieve materials may possess an intrinsic or added catalytic functionality, and such materials are frequently referred to as "molecular sieve catalysts." Additional catalytic functionalities may be provided for molecular sieve materials by conventional methods. Accordingly, the molecular sieve material formed from the gel as set forth above may be calcined to remove the template. The sample may then be allowed to cool, preferably in a dry environment, and then loaded with an additional catalytic functionality.

C. Structural Analysis of Preferred AEL-Type Molecular Sieve Catalysts

The SAPO molecular sieve compositions useful in this invention have a Si content ranging from about 4 molar percent to about 10 molar percent silicon content based on the total amount of silicon in the molecular sieve composition. Preferably, the proportion between silicon atoms having one, two or three silicon atoms as nearest neighbors to those having four silicon atoms should be balanced, so that two conditions are simultaneously fulfilled: the molar ratio between (Si2Si+Si3Si) to Si4Si should be in the range of about 0.7 to about 1.4, and the sum of Si atoms with 2Si, 3Si and 4Si nearest neighbors should be in the range of about 10 to about 80 molar % based on the total amount of silicon in the molecular sieve's framework. As is known by those skilled in the art, the molar percent of Si atoms with one, two, three, and four Si atom nearest neighbors may be obtained, for example, by deconvoluting the integrated intensities from $^{29}$Si NMR measurements, as illustrated in FIG. 2 and Table 1. Table 1 gives the mole fraction of framework silicon in each type of silicon site for samples 1a through 1d and 2a and 2b from the examples.

TABLE 1

| Si Environment Chemical shift in ppm from TMS EXAMPLE | 4Al,0Si −89 to −91 ppm | 3Al,1Si −97 ppm | 2Al,2Si −103 ppm | 1Al,3Si −108 ppm | 0Al,4Si −110 to −113 ppm |
|---|---|---|---|---|---|
| 1a | 17.5 | 9.7 | 4.4 | 1.2 | 67.2 |
| 1b | 4.6 | 34.3 | 6.4 | 7.3 | 47.4 |
| 1c | 4.4 | 13.9 | 8.9 | 8.5 | 64.3 |
| 1d | 1 | 17.0 | 15.1 | 10.4 | 56.5 |
| 2a | 15.5 | 28.9 | 14.3 | 13.9 | 27.4 |
| 2b | 5.4 | 25.3 | 19.7 | 18.2 | 31.4 |

In a particularly preferred embodiment, the number of Si atoms having no Si nearest neighbor ranges from about 1 mol. % to about 20 mol. %, the number of Si atoms having one Si nearest neighbor ranges from about 10 mol. % to about 35 mol. %, the number of Si atoms having two Si nearest neighbors ranges from about 10 mol. % to about 30 mol. %, the number of Si atoms having three Si nearest neighbors ranging from about 10 mol. % to about 30 mol. %, and the number of Si atoms having four Si nearest neighbors ranging from about 15 mol. % to about 50 mol. %

D. Use of the Preferred Molecular Sieves as Naphtha Cracking Catalysts

The preferred catalytic molecular sieve compositions are useful as naphtha cracking catalysts, both alone and in combination with other catalysts, preferably for generating light olefins, and more preferably propylene generation. A preferred catalyst composition contains about 1 wt. % to about 60 wt. % of one or more SAPO molecular sieves such as SAPO11, SAPO-31, and SAPO-41 in an inert inorganic matrix. It may also contain medium-pore silicoalumina zeolite such as ZSM-5, ZSM-22, and ZSM-48. Such catalysts have a dramatically increased catalytic activity for naphtha cracking over conventional catalysts.

The SAPO molecular sieve catalyst may be in the form of particles, and may include fines, inert particles, particles containing a metallic species, and mixtures thereof. The catalyst particles may contain an inorganic oxide matrix component for binding the particle's components together so that the catalyst particle product is hard enough to survive interparticle and reactor wall collisions. The inorganic oxide matrix may be made according to conventional methods from an inorganic oxide sol or gel which is dried to "glue" the catalyst particle's components together. Preferably, the inorganic oxide matrix is not catalytically active and comprises oxides of silicon and aluminum. It is also preferred that separate alumina phases be incorporated into the inorganic oxide matrix. Species of aluminum oxyhydroxides-γ-alumina, boehmite, diaspore, and transitional aluminas such as α-alumina, β-alumina, γ-alumina, δalumina, ε-alumina, κ-alumina, and ρ-alumina can be employed. Preferably, the alumina species is an aluminum trihydroxide such as gibbsite, bayerite, nordstrandite, or doyelite. The matrix material may also contain phosphorous or aluminum phosphate.

The amount of molecular sieve in the catalyst particle will generally range from about 1 to about 60 wt. %, preferably from about 1 to about 40 wt. %, and more preferably from about 5 to about 40 wt. %, based on the total weight of the catalyst. Generally, the catalyst particle size will range from about 10 to 300 microns in diameter, with an average particle diameter of about 60 microns. The surface area of the matrix material will be about $\leq 350$ m$^2$/g, preferably 50 to 200 m$^2$/g, more preferably from about 50 to 100 m$^2$/g. While the surface area of the final catalysts will be dependent on such things as type and amount of molecular sieve used, it will usually be less than about 500 m$^2$/g, preferably from about 50 to 300 m$^2$/g, more preferably from about 50 to 250 m$^2$/g, and most preferably from about 100 to 250 m$^2$/g.

As discussed, the molecular sieve catalysts may be used to convert naphtha into light olefin (preferably propylene) under catalytic conversion conditions that are more specifically described as follows.

Feedstreams which are suitable for producing the relatively high $C_2$, $C_3$, and $C_4$ olefin yields contain primarily paraffins and olefins. Preferred feedstreams are those boiling in the naphtha range and containing from about 5 wt. % to about 35 wt. %, preferably from about 10 wt. % to about 30 wt. %, and more preferably from about 10 to 25 wt. % paraffins, and from about 15 wt. %, preferably from about 20 wt. % to about 70 wt. % olefins. The feed may also contain species such as diolefins, naphthenes, aromatics, and mixtures thereof. Naphtha boiling range streams are typically those having a boiling range from about 65° F. to about 430° F., preferably from about 65° F. to about 300° F. The naphtha can be a thermally cracked or a catalytically cracked naphtha. Such streams can be derived from any appropriate source, for example, they can be derived from the fluid catalytic cracking (FCC) of gas oils and resids, or they can be derived from delayed or fluid coking of resids. It is preferred that the naphtha streams be derived from the fluid catalytic cracking of gas oils and resids. Such naphthas are typically rich in olefins and/or diolefins and relatively lean in paraffins.

Preferably, the processes are performed in a process unit comprised of a reaction zone, a stripping zone, a catalyst regeneration zone, and a fractionation zone. The naphtha feedstream is fed into the reaction zone where it contacts a source of hot catalyst, preferably regenerated catalyst. The hot catalyst vaporizes and cracks the feed at a temperature from about 500° C. to 650° C., preferably from about 500° C. to 600° C. The cracking reaction deposits carbonaceous hydrocarbons, or coke, on the catalyst, thereby deactivating the catalyst. The cracked products are separated from the coked catalyst and sent to a fractionator. The coked catalyst is passed through the stripping zone where volatiles are stripped from the catalyst particles with steam. The stripping can be preformed under low severity conditions in order to retain adsorbed hydrocarbons for heat balance. The stripped catalyst is then passed to the regeneration zone where it is regenerated by burning coke on the catalyst in the presence of an oxygen containing gas, preferably air. Decoking restores catalyst activity and simultaneously heats the catalyst to, e.g., 650° C. to 750° C. The hot catalyst is then recycled to the reaction zone to react with fresh naphtha feed. Flue gas formed by burning coke in the regenerator may be treated for removal of particulates and for conversion of carbon monoxide, after which the flue gas is normally discharged into the atmosphere. The cracked products from the reaction zone are sent to a fractionation zone where various products are recovered, particularly a $C_3$ fraction and a $C_4$ fraction.

The preferred catalysts may be used to increase light olefins yields in a primary FCC process unit (i.e., an FCC unit that converts heavy hydrocarbon feeds such as gas oil), in a preferred embodiment the invention uses its own distinct process unit, as previously described, which receives naphtha from a suitable source in the refinery. The reaction zone is operated at process conditions that will maximize $C_2$ to $C_4$ olefin, particularly propylene, selectivity with relatively high conversion of $C_5+$ olefins to $C_4-$ light olefins.

Preferred process conditions include temperatures from about 500° C. to about 650° C., preferably from about 525° C. to 600° C., hydrocarbon partial pressures from about 10 to 40 psia, preferably from about 20 to 35 psia; and a catalyst to naphtha (wt/wt) ratio from about 3 to 12, preferably from about 4 to 10, where catalyst weight is total weight of the catalyst composite. It is also preferred that steam be concurrently introduced with the naphtha stream into the reaction zone, with the steam comprising up to about 50 wt. % of the hydrocarbon feed. Also, it is preferred that the naphtha residence time in the reaction zone be less than about 10 seconds, for example from about 0.1 to 10 seconds. The above conditions will be such that at least about 60 wt. % of the $C_5+$ olefins in the naphtha stream are converted to $C_4-$ products and less than about 25 wt. %, preferably less than about 20 wt. % of the paraffins are converted to $C_4-$ products, and that propylene comprises at least about 90 mol %, preferably greater than about 95 mol % of the total $C_3$ reaction products with the weight ratio of propylene/total $C_2-$ products greater than about 3.5. It is also preferred that ethylene comprises at least about 90 mol % of the $C_2$ products, with the weight ratio of propylene:ethylene being greater than about 4, and that the "full range" $C_5+$ naphtha product is enhanced in both motor and research octanes relative to the naphtha feed. It is within the scope of this invention that the catalysts be precoked prior to introduction of feed in order to further improve the selectivity to propylene. It is also within the scope of this invention that an effective amount of single ring aromatics be fed to the reaction zone to also improve the selectivity of propylene vs. ethylene. The aromatics may be from an external source such as a reforming process unit or they may consist of heavy naphtha recycle product from the instant process.

The invention is further exemplified by the following non-limiting examples.

EXAMPLES

Example 1

Preparation of a Conventional Sample of SAPO-11

A sample of conventional SAPO-11 was prepared in accordance with the procedure set forth in Zubowa et al; *J. Chem. Soc. Faraday Trans* 86, 2307 (1990). More specifically the synthesis used was as follows:

$H_3PO_4$ (Riedel-de-Haën, 85%) was agitated during 10–15 minutes with the required amount of $H_2O$ (Milli Q). On this solution the pseudobohemite (Catapal B, 73.7% $Al_2O_3$) was added and the mixture was agitated for two hours. Dipropylamine (DPA, Aldrich) and Ludox AS40 (Aldrich 40%) were then added successively. After two more hours of agitation, the preparation of the gel was concluded. Gels prepared in accord with this process have stoichiometries in the range of

$$xAl_2O_3:P_2O_5:yDPA:0.6SiO_2:62H_2O,$$

wherein x is ranges from about 1 to about 1.2, y ranges between about 1 and about 2.5, and Z ranges between about 0 and about 1.5. More specifically, the sample prepared in this example was

$$Al_2O_3:P_2O_5:DPA:0.6SiO_2:62H_2O.$$

The gel was introduced in 60 ml Teflon lined autoclaves, which were about 50% filled up, and was crystallized at 195° C. for about 16 hours. The crystallized products were washed and centrifuged 3 times at 14.000 rpm. The resultant solid was dried at 100° C.

The samples were calcined in accordance with the following program:
(a) Flow of $N_2$ (150 ml.min$^{-1}$), at 2° C. min$^{-1}$ until reaching 550° C.
(b) At 550° C. are kept under the $N_2$ flow during 1 hour.
(c) $N_2$ is changed to air (150 ml.min$^{-1}$) and kept at 550° during 3 hours.
(d) The system is let to cool down under the flow of air.
(e) During the calcination procedure the height of the bed was 0.5 cm.

Figure 4:
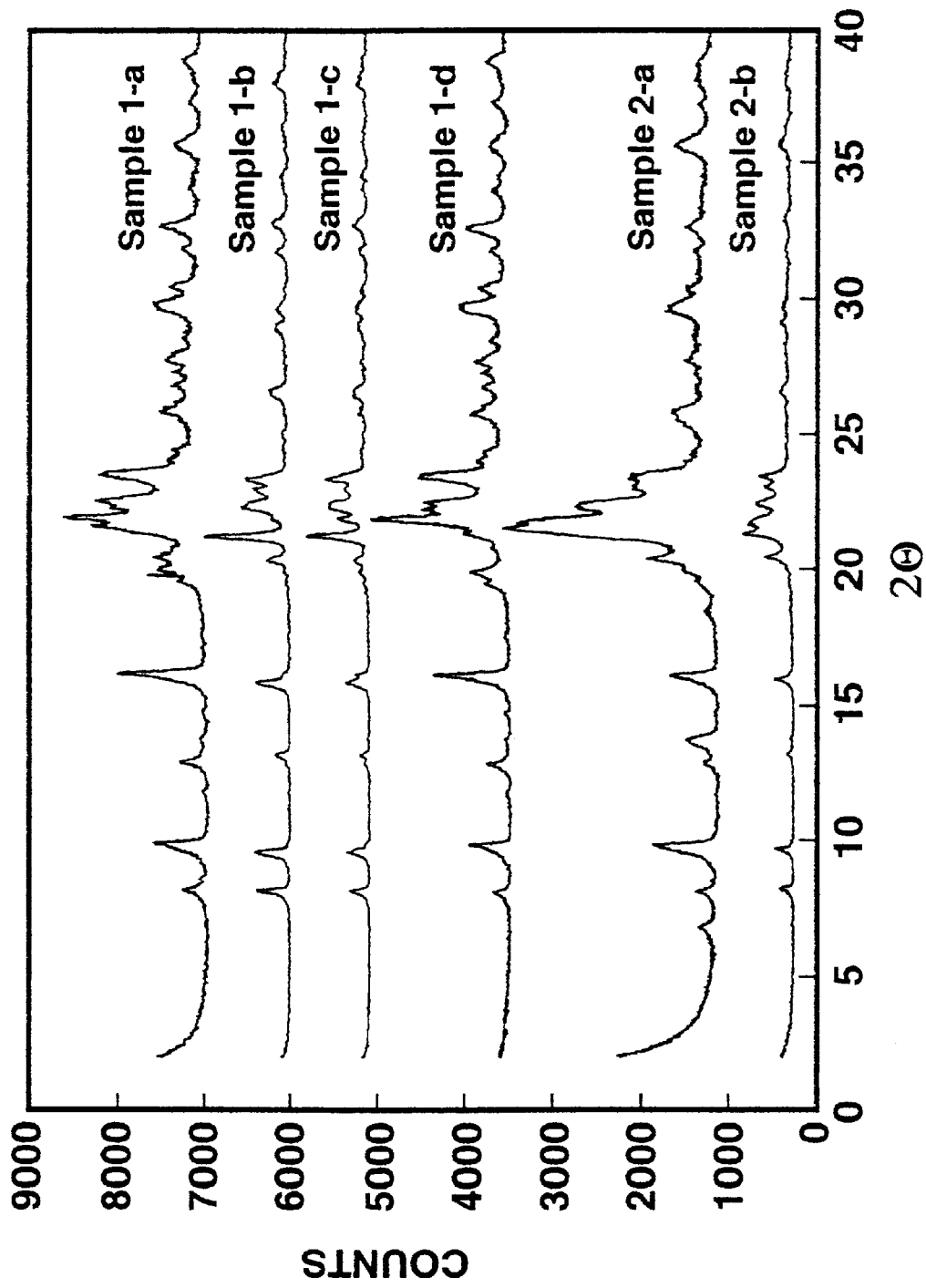
FIG. 4 shows power x-ray diffraction results for the samples described herein.

The powder x-ray diffraction pattern for these samples, shown in FIG. 4(a), demonstrates that a substantially pure SAPO-11 resulted. The sample is designated herein as Sample 1-a.

Sample 1-a was further characterized using $^{29}Si$ MAS NMR spectroscopy and the data generated is shown on FIG.

5-a. This solid state $^{29}$Si MAS NMR spectrum and all others appearing hereafter were recorded on a Varian VXR S 400 WB spectrometer at 79.5 MHz using 7 mm CP/MAS Varian probe with zirconia rotors. To acquire the spectra, pulses of 4.2 μs corresponding to π/3 rad pulse length were applied, with a 40 s recycle delay and a rotor spinning rate of 5 KHz.

Three additional samples of conventional SAPO-11 were prepared in accordance with the procedure set forth in U.S. Pat. No. 4,440,871. Accordingly, Al isopropoxide was introduced into a polypropylene flask, which was provided with a tope for passage of a stirrer. A solution of $H_3PO_4$ was prepared with the total amount of water (milli Q) required for the synthesis. The $H_3PO_4$ solution was added to the polypropylene flask, located in a $H_2O$ bath at 20±2° C. The mixture was stirred during 2 hours using a teflon stirrer at 350 rpm.

After two hours time, the stirring was stopped and the necessary silica was added from LUDOX AS40, and the mixture was stirred for 2 hours. Finally, the DPA was added and the synthesis mixture was stirred for 2 hours to form the synthesis gel. The gel prepared in this way is white, and had the Ph as given in Table 2.

The general composition of the gel was

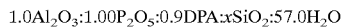

1.0Al$_2$O$_3$:1.00P$_2$O$_5$:0.9DPA:$x$SiO$_2$:57.0H$_2$O

The gel composition and the yield of the solid product obtained are also given in Table 2.

The gel was distributed among 6 teflon-lined autoclaves of 60 ml of capacity each (40 g of synthesis gel in each autoclave), and the crystallization was conducted in static mixing at 195° C. for 48 hours. After this, the product of each autoclave was washed with 240 ml of $H_2O$ and centrifuged. The three solid samples of SAPO-11 were dried at 40° C., and are designated herein as Samples 1-b, 1-c, and 1-d. Powder x-ray diffraction patterns for the samples, shown respectively in FIGS. 4b, 4c and 4d, demonstrate that a substantially pure SAPO-11 resulted.

$^{29}$Si MAS NMR results from samples 1-b, 1-c, and 1-d are set forth respectively in FIGS. 5b, 5c, and 5d. As is evident from the spectra, all conventional SAPO-11 samples (FIG. 5a through 5d) show substantial silicon islanding as indicated by the number of silicon atoms in the framework having four silicon atom nearest neighbors.

10–15 minutes. The $H_3PO_4$ solution was added to the polypropylene flask, which was placed into a water bath at 20±2° C. The mixture was stirred during 2 hours with a Teflon stirrer, at 350 rpm. After this time the stirring was stopped and 15.21 g of DPA were added, and the mixture was stirred during 2 hours.

68.27 g of 1 hexanol (Aldrich 95%), 30 g of $H_2O$ and 5.75 g of hexadecilamine (Aldrich 99%) were combined in a glass flask, and the resultant solution was stirred during 1 hour.

The hexanol solution, together with 9.30 g of tetraethylorthosilicate (TEOS) (Merck-Schuchardt >98%) and 26.81 g of $H_2O$ (milli Q) were added to the polypropylene flask, and the mixture was stirred during 2 hours in order to form the synthesis gel.

The resultant gel was white, and the pH was 4.33.

40 g of the synthesis gel were introduced in the 60 ml teflon-lined autoclaves, and the crystallization was carried out at 195° C. in static mixing (without stirring) during 24 hours.

The resultant samples were washed first with 240 ml of $H_2$), followed by 30 ml ethanol; and finally 240 ml of $H_2O$ while centrifuging. The yield was 0.17 g dried solid. g$^{-1}$ gel. A portion of the uncalcined SAPO-11 was enclosed. This material was calcined using the protocol as was used for sample 1-a. The resulting sample is referred to herein as sample 2-a.

The composition of the gel was

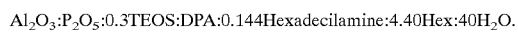

Al$_2$O$_3$:P$_2$O$_5$:0.3TEOS:DPA:0.144Hexadecilamine:4.40Hex:40H$_2$O.

Figure 3:
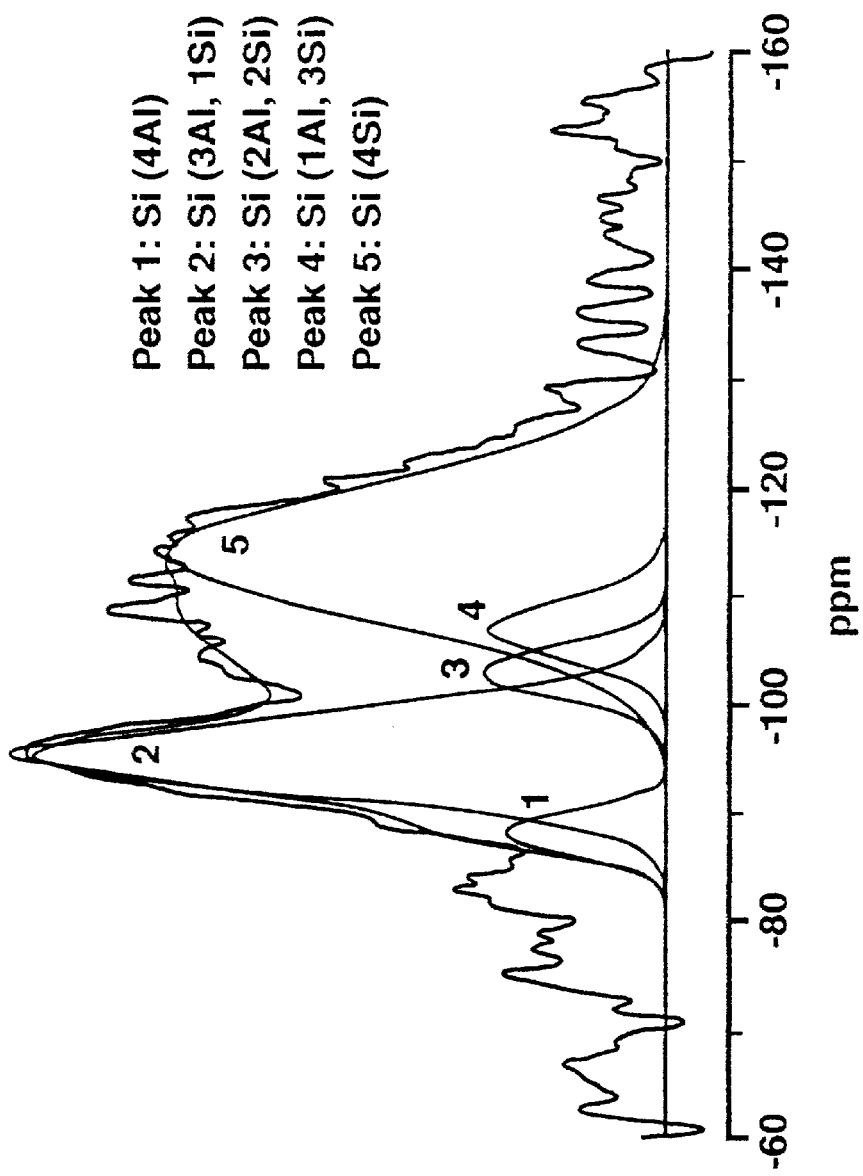
FIG. 3 is a deconvolution of a $^{29}Si$ MAS NMR spectrum of conventionally-prepared SAPO-11 with a 2.47 wt. % Si content.

Powder x-ray diffraction data, shown in FIG. 3(e), demonstrates that the product is isostructural with SAPO-11. $^{29}$Si MAS NMR was used to characterize the local atomic environment of Si atoms in the SAPO framework. That data is shown in FIG. 5(e). As is clear from the data, Sample 2-a exhibits a greatly reduced amount of silicon islanding when compared to Samples 1-a through 1-d, for approximately the same amount of silicon in the synthesis solution.

A second SAPO sample was prepared from a surfactant-containing synthesis solution in order to investigate the degree of Si islanding at higher silica concentration.

TABLE 2

| EXAMPLE | Al$_2$O$_3$ | P$_2$O$_5$ | DPA | SiO$_2$ | CA | SOL | H$_2$O | Yield (%)$^{(1)}$ | Si(wt) | pH$_i^{(2)}$ |
|---|---|---|---|---|---|---|---|---|---|---|
| 1a | 1.0 | 1.0 | 1.0 | 1.6 | 0 | 0 | 62 | 15 | 5.78 | 3.48 |
| 1b | 1.0 | 1.0 | 0.9 | 0.6 | 0 | 0 | 57 | 17 | 2/47 | 6.65 |
| 1c | 1.0 | 1.0 | 0.9 | 1.0 | 0 | 0 | 57 | 17 | 6.24 | 7.37 |
| 1d | 1.0 | 1.0 | 0.9 | 1.5 | 0 | 0 | 57 | 17 | 4.68 | 6.98 |
| 2a | 1.0 | 1.0 | 1.0 | 0.3 | 0.144 | 4.40 | 40 | 17 | 10.04 | 4.33 |
| 2b | 1.0 | 1.0 | 1.0 | 1.0 | 0.144 | 4.40 | 40 | 18 | 3.58 | 4.50 |

$^{(1)}$Yield: (g · solid product/g · gel)*100
$^{(2)}$pH of the synthesis gel

Example 2

Synthesis of a SAPO-11 Using a Surfactant-Containing Synthesis Solution 20.34 g of Al$_2$O$_3$ (Condea Pural SB 74.6%) were introduced in a 500 ml polypropylene flask, which was provided with a tope for passage of an agitator.

A solution of 34.31 g of $H_3PO_4$ (Riedel-de-Haën 85%), and 30 g of $H_2O$ (milli Q) was prepared by agitation during Accordingly, a sample of SAPO-11 was synthesized using surfactants and with a higher Si content than any of the previously prepared samples. This sample was prepared according to the same synthesis procedure as Sample 2-a, and the gel composition and solid yield is given in Table 2. FIG. 2 shows the powder XRD. This sample referred to as Sample 2-b herein. The powder x-ray diffraction data reveals the presence of some tridimite impurities in Sample 2-b.

Example 3

Acidity Measurements

The total amount of Bronsted and Lewis acid sites, as well as the acid strength distribution of all samples was determined by adsorption and thermal desorption of pyridine is accordance with known procedures. In this example, it is assumed that at 150° C. of pyridine desorption temperature all the acid sites are measured. While at 350° C. only the strongest acid sites will be able to retain pyridine.

IR spectroscopy was used to probe hydroxyl stretching modes in the samples before and after pyridine adsorbtion. Pyridine adsorbtion at Bronsted (1545 cm$^{-1}$) and Lewis (1455 cm$^{-1}$) acid sites are determined by calculating the integrated intensities of the IR absorbtion bands. The results are set forth in Table 3.

TABLE 3

| Example Number | Bronsted (micromole py/gr cat.) | | | Lewis (micromole py/gr cat.) | | |
|---|---|---|---|---|---|---|
| | 150° C. | 250° C. | 350° C. | 150° C. | 250° C. | 350° C. |
| 1-a | 12 | 6 | 0 | 6 | 4 | 2 |
| 1-b | 16 | 9 | 1 | 6 | 4 | 2 |
| 1-c | 13 | 8 | 1 | 5 | 3 | 1 |
| 1-d | 14 | 8 | 0 | 4 | 2 | 1 |
| 2-a | 14 | 13 | 2 | 5 | 6 | 3 |
| 2-b | 18 | 13 | 0 | 10 | 8 | 0 |

Table 3 shows that the sample synthesized with surfactant (2-a and 2-b) have a higher total Bronsted acidity than the conventionally synthesized samples. Importantly, Sample 2-b has more Bronsted acid sites than do Samples 1-b and 1-d with lower (Sample 1-b) and higher (Sample 1-d) Si content in the synthesis solution. These data are in agreement with the NMR data which shows increased proportion of Si—O—Al bonding which inherently means higher and stronger acidity.

Example 4

Catalytic Activity

The surfactant-prepared SAPO materials described herein were evaluated for effectiveness in catalytic cracking processes.

The preferred SAPO-11 catalysts are useful as FCC Catalysts for generation light olefins such as of propylene. A series of tests were conducted with a conventional SAPO-11 and a commercial ZSM-5 additive catalyst. The tests were carried out under conventional catalytic cracking conditions with 75 wt. % conventional large pore zeolite catalyst as the base cracking catalyst and 25 wt. % of the preferred SAPO-11 catalyst. The test conditions included a 511° C. reaction temperature, 2.5–5.0 catalyst to oil ratio, and a heavy gas oil feed.

As can be seen from the data presented in Table 4 even conventionally prepared SAPO-11 is a selective catalyst for olefin generation. At 74–75 wt. % conversion, the propylene-to-butylene ratio from addition of conventional SAPO-11 is 3.0, which compares favorably to the commercial FCC additive catalyst, which showed a propylene-to-butylene ratio of 1.3. In addition to the superior propylene-to-butylene selectivity, the propane and butane light saturate yields were also lower with conventional SAPO-11.

Although highly selective, the conventional SAPO-11 showed lower activity than the ZSM-5 additive catalyst, as is shown by the naphtha yield reduction of 0.9% when the conventional SAPO-11 was used as a FCC additive. This contrasts with the ZSM-5 additive, which reduced naphtha yield by 4.0 wt. %. From these data, one can estimate that commercial FCC additive catalysts is about four times more active than the SAPO-11 which was made in the conventional manner.

As can be seen from Table 5, the activity of the preferred surfactant-prepared SAPOs described herein are substantially more active than conventional SAPO-11. The conventional SAPO-11 showed 42–44 wt. % conversion at a WHSV of 14 hr$^{-1}$ in cracking of hexene/hexane model compounds at 575° C., whereas the surfactant-prepared SAPO (Sample 2-a) catalyst of this invention showed 43 wt. % conversion at 144 hr$^{-1}$ WHSV. From these data, it can be estimated that the surfactant-prepared SAPO-11 is about 10 times more active than conventional SAPO-11. Equally important, the conventional SAPO-11 and the preferred AEL-type SAPO catalyst of this invention are equally selective, at 74–80%, in spite of the tremendous activity difference.

TABLE 4

| Catalyst | Commercial FCC Additive Catalyst | Conventional SAPO-11 |
|---|---|---|
| Naphtha, Wt. % | −4.0 | −0.9 |
| Key Results, Wt. % | | |
| Propylene | 2.1 | 0.9 |
| Butenes | 1.6 | 0.3 |
| Propane | 0.1 | −0.2 |
| Butanes | 0.8 | 0.0 |
| Selectivity, % | | |
| $C_3$=$C_4$ = Ratio | 1.3 | 3.0 |

All data shown are delta yields at 74–75 wt. % conversion

TABLE 5

(50/50 hexane/hexene, 575° C., 44 wt. % conversion)

| Catalyst WHSV, Hr−1 | SAPO-11 14 | Sample 2-a 144 | Sample 2-b 192 |
|---|---|---|---|
| Conversion, Wt. % | 44.3 | 42.5 | 44.3 |
| Key Results, Wt. % | | | |
| Ethylene | 2.4 | 2.1 | 2.1 |
| Propylene | 32.8 | 33.9 | 33.7 |
| Butenes | 5.0 | 4.2 | 4.8 |
| Light Saturates | 3.0 | 2.4 | 2.2 |
| Aromatics | 1.1 | 0.5 | 1.5 |
| Selectivity, % | | | |
| Propylene | 74.0 | 79.8 | 76.1 |

The third columns of Table 5 shows that even greater activity for a mixture of surfactant-prepared SAPO-11 and SAPO-41. The preferred surfactant-prepared SAPO materials described herein are also effective naphtha cracking catalysts. A conventionally-prepared SAPO-11 and Sample 2-a were compared under conventional naphtha cracking conditions (575° C. temperature, 48 hr$^{-1}$ WHSV) in order to demonstrate the catalytic effectiveness of the surfactant-prepared material with a light cat naphtha feed. As shown in Table 6, the -prepared material (Sample 2-a) was nearly twice as active (and substantially more selective) than the conventionally-prepared SAPO-11.

TABLE 6

| Catalyst | Conventional SAPO-11 | Sample 2-a |
|---|---|---|
| Conversion, Wt. % | 23.2 | 39.2 |
| Key Results, Wt. % | | |
| Ethylene | 2.2 | 4.0 |
| Propylene | 11.6 | 22.0 |
| Butenes | 7.3 | 10.6 |
| Lt Sats | 2.1 | 2.8 |
| Selectivity, % | | |
| Propylene | 50.0 | 56.1 |

What is claimed is:

1. A process for selectively producing $C_2$ to $C_4$ olefins, the process comprising contacting, under catalytic conversion conditions, a naphtha containing paraffins and olefins with a catalytically effective amount of a catalyst composition containing a SAPO catalyst, the SAPO catalyst having a framework with a total silicon amount ranging from about 0.2 molar % to about 40 molar %, a total aluminum amount ranging from about 30 molar % to about 49.9 molar %, and a total phosphorus amount ranging from about 10 molar % to about 49.9 molar %, the molar percents being based on the total amount of aluminum, phosphorus, and silicon present in the composition, and the SAPO catalyst being isostructural with the AEL structure and containing silicon, aluminum, and phosphorus, wherein (a) the silicon present in the SAPO catalyst is distributed among silicon sites, each site having a first, a second, a third, and a fourth nearest neighbor position, and each position being independently occupied by one atom selected from silicon and aluminum, and (b) the composition has a first number of silicon sites having silicon atoms in the four nearest neighbor positions (Si4Si), a second number of silicon sites having silicon atoms in three of the four nearest neighbor positions (Si3Si), and a third number of silicon sites having silicon atoms in two of the four nearest neighbor positions (Si2Si), wherein (i) the sum of the first, second, and third number of silicon sites ranges from about 10 to about 80 molar %, and (ii) the molar ratio of the sum of the third and second number of silicon sites to the first number of silicon sites ranges from about 0.7 to about 1.4, the molar % being based on the total number of silicon sites in the framework.

2. The process of claim 1 wherein the SAPO catalyst's Si content in the framework ranges from about 4 mol. % to about 10 mol. %.

3. The process of claim 2 wherein the number of framework Si atoms having no Si nearest neighbor ranges from about 1 mol. % to about 20 mol. %, the number of Si atoms having one Si nearest neighbor ranges from about 10 mol. % to about 35 mol. %, the number of Si atoms having two Si nearest neighbors ranges from about 10 mol. % to about 30 mol. %, the number of Si atoms having three Si nearest neighbors ranges from about 10 mol. % to about 30 mol. %, and the number of Si atoms having four Si nearest neighbors ranging from about 15 mol. % to about 50 mol. %, the mol. % being based on the total amount of silicon in the framework.

4. The process of claim 3 wherein the molar % of framework silicon atoms having aluminum atom nearest neighbors is measured by $^{29}Si$ MAS NMR.

5. The process of claim 4 wherein the SAPO catalyst contains a second molecular sieve isostructural with at least one of ZSM-5, ZSM-22, ZSM-48, SAPO-11, SAPO-31 and SAPO-41.

6. The process of claim 5 wherein the catalyst composition is in the form of a particle and the amount of molecular sieve in the particle ranges from about 1 to about 60 wt. %, based on the total weight of the catalyst, wherein the particle's diameter ranges from about 10 to 300 microns, with an average particle diameter of about 60 microns, wherein the catalyst's surface area is less than about 500 $m^2/g$.

7. The process of claim 1 wherein the naphtha is a thermally or catalytically cracked naphtha boiling in the naphtha boiling range and containing from about 5 wt. % to about 35 wt. % paraffins, and from about 15 wt. % to about 70 wt. % olefins.

8. The process of claim 7 wherein the catalytic conversion conditions include temperatures ranging from about 500° C. to about 650° C.; hydrocarbon partial pressures from about 10 to 40 psia; and a catalyst to feed (wt/wt) ratio from about 3 to 12; wherein catalyst weight is total weight of the catalyst composite.

9. The process of claim 8 wherein steam is concurrently introduced with the feed into the reaction zone, with the steam comprising up to about 50 wt. % of the feed.

10. The process of claim 9 wherein the feed's residence time in the reaction zone is less than about 10 seconds.

11. The process of claim 10 wherein the weight ratio of propylene to ethylene in the olefin is at least about 4.

12. A process for selectively producing $C_2$ to $C_4$ olefins, the process comprising contacting, under catalytic conversion conditions, a catalytically or thermally cracked naphtha containing paraffins and olefins with a catalytically effective amount of a catalyst composition containing a SAPO catalyst, the SAPO catalyst being formed from a silicoaluminophosphate gel having the formula

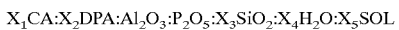

$$X_1CA:X_2DPA:Al_2O_3:P_2O_5:X_3SiO_2:X_4H_2O:X_5SOL$$

wherein CA is at least one of hexadecylamine, dodecylamine, and decylamine; DPA is a template of at least one of di-n-propylamine, diisopropylamine, and tetrabutylammonium hydroxyde; SOL is a solvent of at least one of the $C_4$–$C_{10}$ alcohols, polyalcohols, phenols, ketones, polyethers; $X_1$ ranges from about 0.001 to about 0.5, $X_2$ ranges from about 0.5 to 2, $X_3$ ranges from about 0.01 to about 3, $X_4$ ranges from about 4 to about 300, and $X_5$ ranges from about 0.1 to about 50.

13. The process of claim 12 wherein the silicoaluminophosphate gel is formed by combining alumina, phosphoric acid, and water to form a solution, adding the template and the surfactant CA in order to form the synthesis mixture, and then stirring a synthesis mixture to form the gel.

14. The process of claim 13 wherein the gel is heated for at least about 6 hours, at a temperature ranging from about 150° C. to about 210° C., and at a pressure ranging from about 0 to about 40 bar in order to form the molecular sieve.

15. The process of claim 14 wherein the naphtha boils in the naphtha boiling range and contains from about 5 wt. % to about 35 wt. % paraffins, and from about 15 wt. % to about 70 wt. % olefins.

16. The process of claim 15 wherein the catalytic conversion conditions include temperatures ranging from about 500° C. to about 650° C.; hydrocarbon partial pressures from about 10 to 40 psia; and a catalyst to feed (wt/wt) ratio from about 3 to 12; wherein catalyst weight is total weight of the catalyst composite.

17. The process of claim 16 wherein steam is concurrently introduced with the feed into the reaction zone, with the steam comprising up to about 50 wt. % of the feed.

18. The process of claim 17 wherein the feed's residence time in the reaction zone is less than about 10 seconds.

19. The process of claim 18 wherein the weight ratio of propylene to ethylene in the product is at least about 4.

20. The process of claim 12 wherein the propylene to butylene ratio in the $C_2$ to $C_4$ olefin product is at least about 3.0.

21. The process of claim 12 wherein propylene comprises at least about 90 mol. % of a total amount of $C_3$ product.

* * * * *